United States Patent
Cariello

(10) Patent No.: US 12,182,015 B2
(45) Date of Patent: Dec. 31, 2024

(54) WEIGHTED VALID ADDRESS COUNT FOR GARBAGE COLLECTION

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/883,105

(22) Filed: Aug. 8, 2022

(65) Prior Publication Data
US 2024/0045799 A1    Feb. 8, 2024

(51) Int. Cl.
*G06F 12/02*          (2006.01)

(52) U.S. Cl.
CPC ...... *G06F 12/0253* (2013.01); *G06F 12/0246* (2013.01); *G06F 2212/7205* (2013.01)

(58) Field of Classification Search
None
See application file for complete search history.

(56) References Cited

U.S. PATENT DOCUMENTS

| | | | | |
|---|---|---|---|---|
| 10,643,119 | B2 * | 5/2020 | Chiu | G11C 11/5607 |
| 10,739,996 | B1 * | 8/2020 | Ebsen | G06F 16/1727 |
| 2019/0155521 | A1 * | 5/2019 | Bahirat | G06F 3/0619 |
| 2020/0097403 | A1 * | 3/2020 | Saxena | G06F 12/0246 |
| 2021/0223976 | A1 * | 7/2021 | Zhu | G06F 3/0652 |

* cited by examiner

*Primary Examiner* — Eric J Yoon
*Assistant Examiner* — Marwan Ayash
(74) *Attorney, Agent, or Firm* — Holland & Hart LLP

(57) ABSTRACT

Methods, systems, and devices for weighted valid address count (VAC) for garbage collection are described. A memory system may select a data block for reorganization (e.g., garbage collection) based on a weighted VAC. The memory system may include valid data units associated with various types of data and may track respective quantities of valid data units associated with respective types of data. The memory system may determine the weighted VAC of the data block based on a weighted average of the respective quantities of valid data units, where respective weights may be applied to the respective quantities of valid data units. The memory system may select the data block based on the weighted VAC, which may be different than a total VAC of the data block, and may perform a reorganization procedure on the selected data block.

23 Claims, 5 Drawing Sheets

WEIGHTED VALID ADDRESS COUNT FOR GARBAGE COLLECTION

FIELD OF TECHNOLOGY

The following relates to one or more systems for memory, including weighted valid address count (VAC) for garbage collection.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
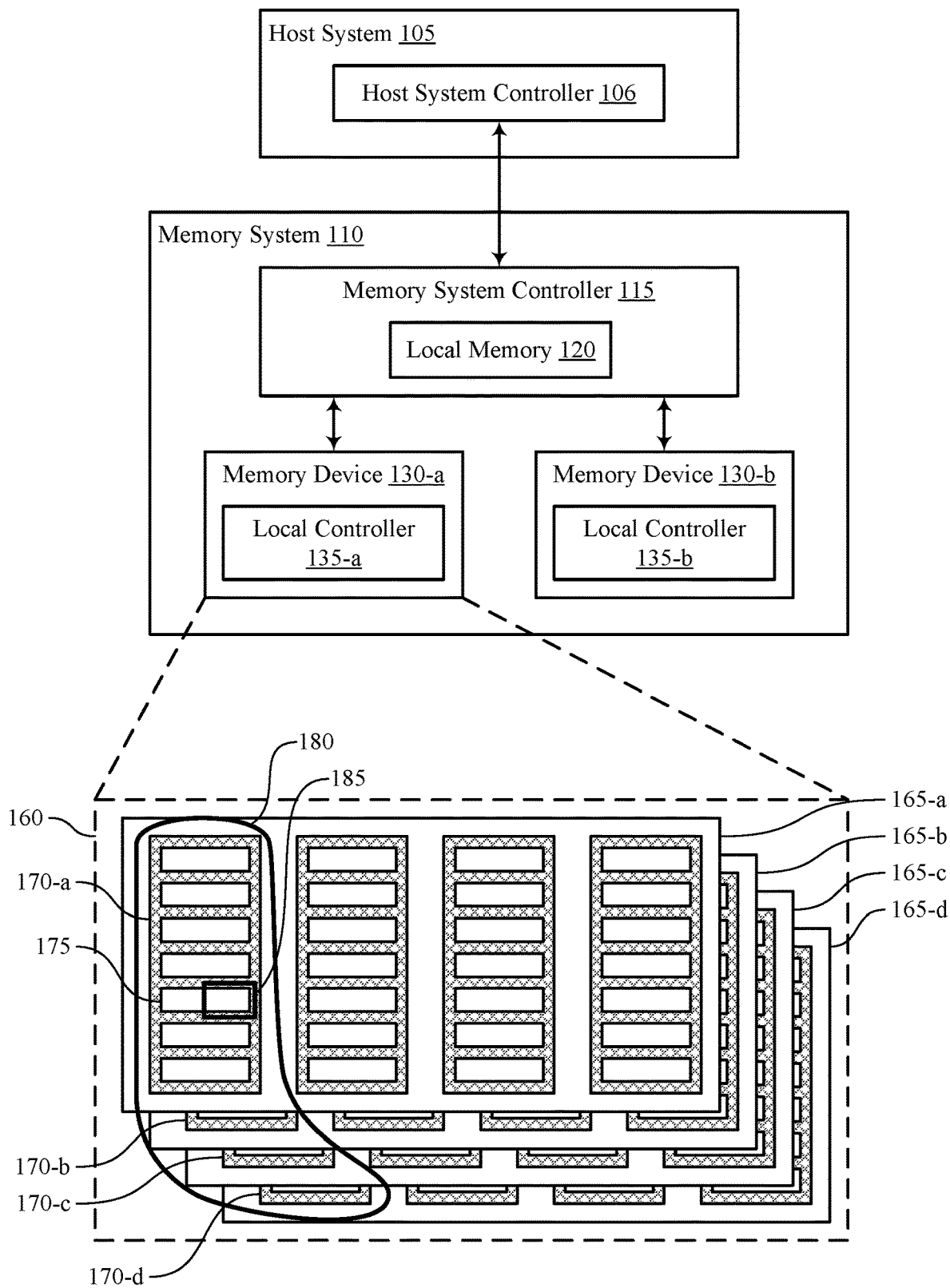
FIGS. 1 and 2 illustrate examples of systems that support weighted valid address count (VAC) for garbage collection in accordance with examples as disclosed herein.

Some devices may perform various operations associated with a reorganization procedure (e.g., garbage collection). For example, a block (e.g., a data block, a virtual block) may include pages of valid data, pages of invalid data (e.g., old data that was previously written but is no longer associated with a valid logical address, such as a logical address referenced by a host system in a logical-to-physical (L2P) mapping table), empty pages (e.g., a page that includes no data, such as a page that has never been written to or that has been erased), or a combination thereof. In some cases, a memory system may maintain (e.g., store, keep, track) a valid address count (VAC) (e.g., a valid page count, where a page may be a virtual page (e.g., a translation unit), matching the write/read granularity for a given protocol) for data units stored within the blocks, such as the data blocks. The VAC for a given data block may be a count of the quantity of valid data units (e.g., valid page addresses, valid virtual page addresses) within the data block. In some examples, the VAC may be represented as a ratio the quantity of valid data units to a total quantity of data units (e.g., valid data units+invalid data units+empty data units) included in the data block. In response to each event where a data unit that was written to a data block is overwritten (e.g., written to a new location) or unmapped (e.g., marked as invalid), the VAC may be updated (e.g., decremented) to reflect the new count of valid data units within the data block. Similarly, in response to data being written to an empty data unit of the data block, the VAC may be updated (e.g., incremented) to reflect the new count. Based on the life of the data (e.g., a data temperature, a tendency for being overwritten, frequency of becoming invalid), each data unit may be associated with a type of data (e.g., a temperature, data associated with different streams or applications).

In some cases, a memory system may perform a garbage collection procedure to free up data blocks, for example, by moving (e.g., writing) valid data to other destination data blocks and then erasing the data block. The memory system may utilize VACs to select data blocks for the garbage collection procedure. For example, the memory system may utilize a selection procedure (e.g., a greedy selection procedure) that prioritizes data blocks with lower VAC values (e.g., a data block with less valid data units). However, the VAC may not include information about the different types of data (e.g., hot data, warm data, cold data, data per stream, among other types of data) stored in the valid data units. As such, data blocks storing a relatively higher quantity of hot data (e.g., data associated with a relatively higher likelihood of being overwritten compared to other data, data associated with a relatively higher likelihood of being overwritten above a threshold) may be prioritized for garbage collection, for example, due to having VACs that fall more quickly (e.g., than data blocks storing relatively higher quantities of cold data). As a result, data from these blocks moved to destination blocks may become invalidated after a short duration of time, resulting in an inefficient garbage collection procedure. For example, because hot data is invalidated more frequently than cold data (e.g., data associated with a relatively lower likelihood of being overwritten compared to other data, data associated with a relatively lower likelihood of being overwritten less than a threshold), after the hot data blocks have been moved, a VAC of the destination data block may fall rapidly, thus necessitating the destination data block to be garbage collected as well, which may result in more frequent garbage collection procedures, reduced endurance, performance loss, and increased latency.

The techniques described herein enable a memory system to select a data block for reorganization (e.g., garbage collection) based on a weighted VAC that prioritizes valid data units of a data type (e.g., cold data) associated with becoming invalidated after a longer duration, which will result in a more efficient garbage collection procedure. For instance, the memory system may track (e.g., record, update, store) quantities of valid data units included in a data block that are associated with various types of data. The memory system may track a first quantity of valid data units of a first type of data (e.g., hot data, data from a first stream) and a second quantity of valid data units of a second type of data (e.g., cold data, data from a second stream) included in the data block. The memory system may determine the weighted VAC of the data block, for example, by computing a weighted average of the first quantity of valid data units and the second quantity of valid data units. In some cases, the weighted VAC may be different than a total VAC of the data block, and the memory system may select the data block for garbage collection (e.g., according to the greedy selection procedure) based on the weighted VAC (e.g., instead of solely the total VAC).

By selecting data blocks for garbage collection based on the weighted VAC, garbage collect procedure frequency and latency will be reduced. For example, data blocks having relatively higher quantities of valid cold data will be prioritized over data blocks having relatively higher quantities of valid hot data. As a result, destination blocks associated with a garbage collect procedure will maintain a higher VAC for a longer period of time after the garbage collect procedure, thereby reducing a frequency that garbage collect procedures are performed. Additionally, because garbage collection on data blocks having relatively higher quantities of hot data may be delayed, additional data units of these data blocks may be overwritten and marked invalid by the time these data blocks are selected for garbage collection, thereby reducing an amount of data to be written to one or more destination blocks. Thus, a latency associated with garbage collection of these data blocks will be reduced, among other advantages.

Figure 2:
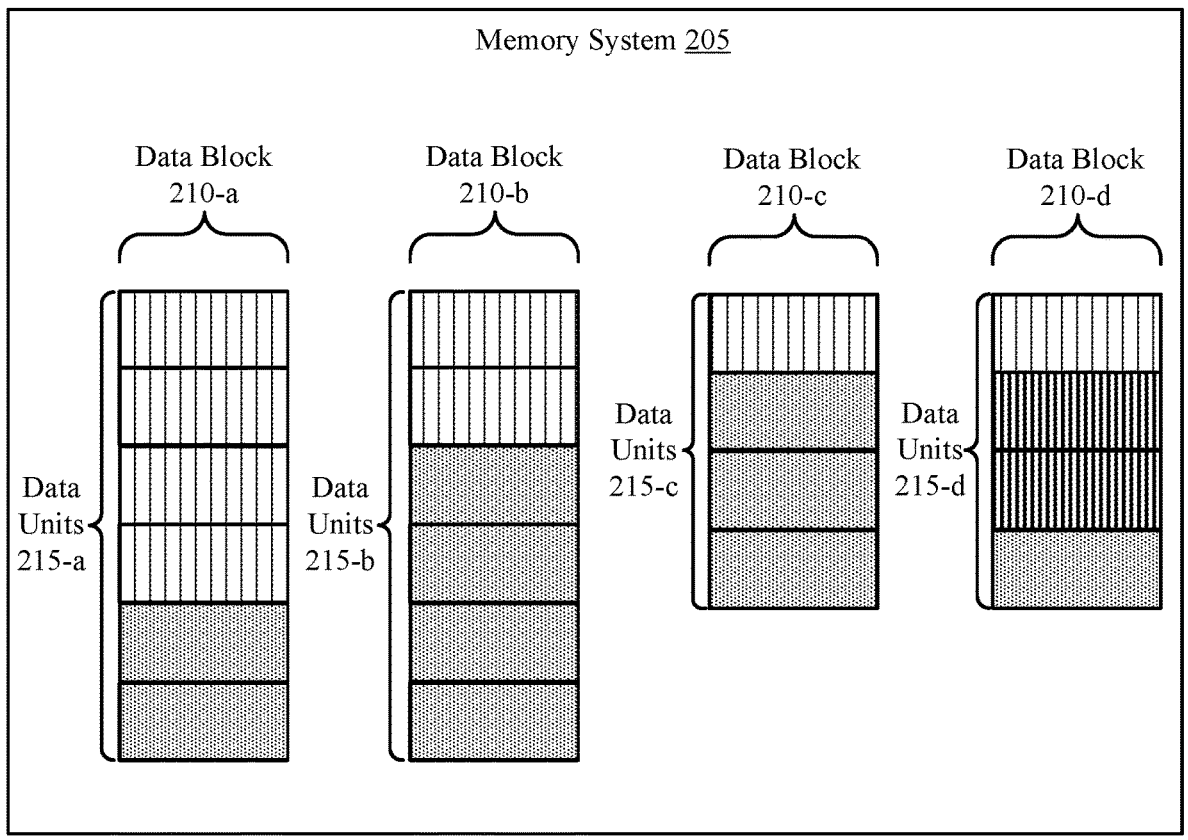
Figure 3A:
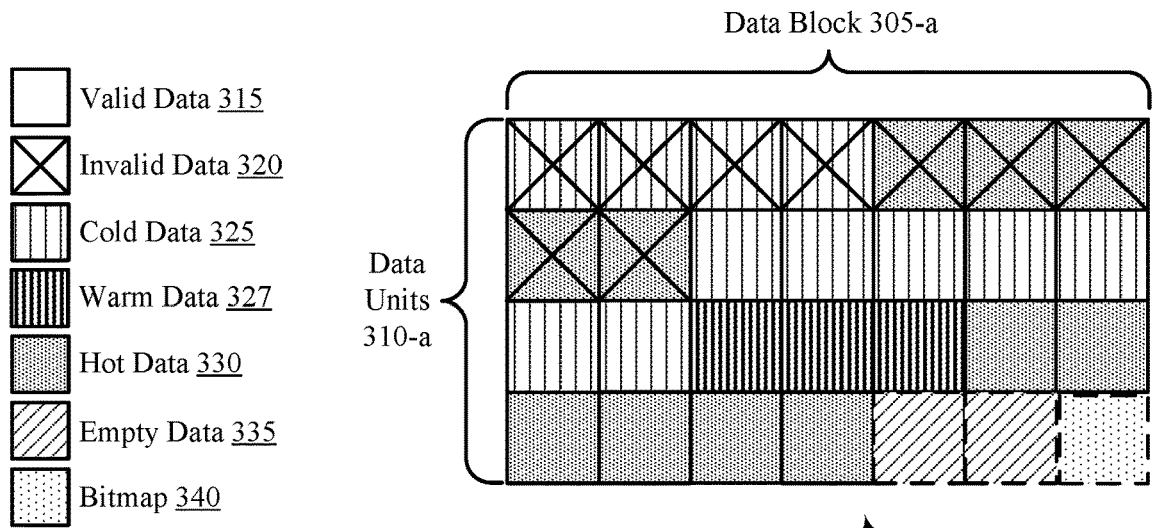
FIGS. 3A and 3B illustrate examples of configurations that support weighted VAC for garbage collection in accordance with examples as disclosed herein.
Figure 3B:
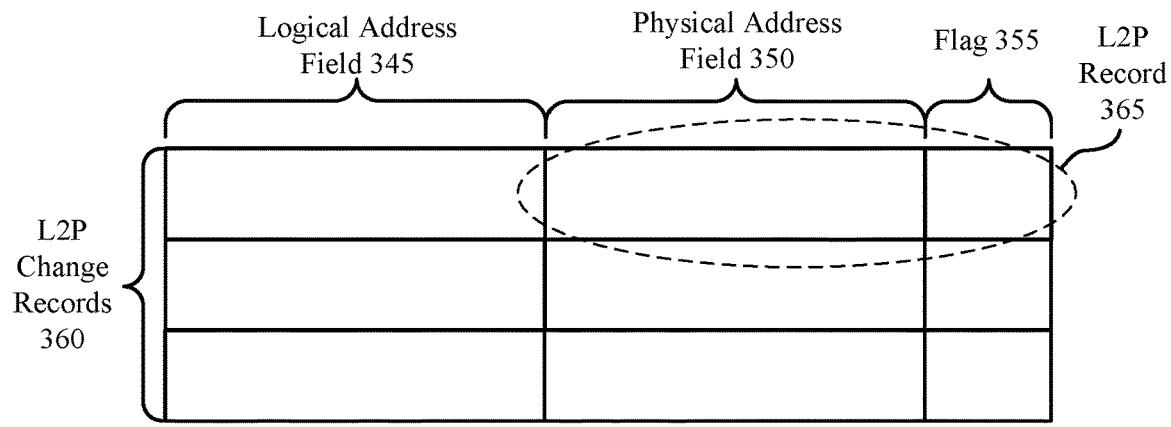
Figure 3B:
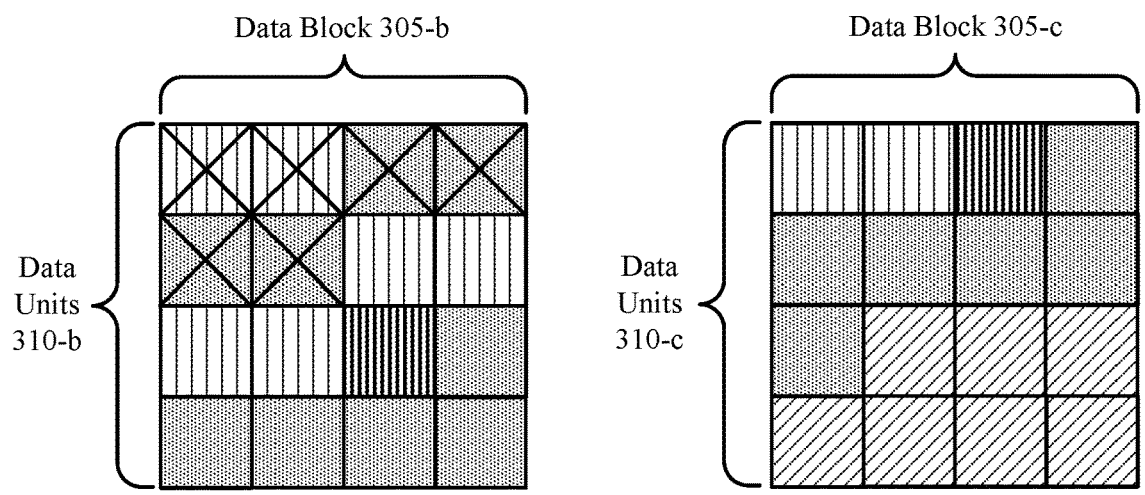

Features of the disclosure are initially described in the context of systems, devices, circuits, and configurations with reference to FIGS. 1 through 3. These and other features of the disclosure are further illustrated by and described in the context of an apparatus diagram and flowchart that relate to weighted VAC for garbage collection with reference to FIGS. 4 through 5.

FIG. 1 illustrates an example of a system 100 that supports weighted VAC for garbage collection in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a virtual block 180 may include virtual pages. For example, the pages 175 may include at least a first quantity of storage (e.g., 16 kilobyte (kB), among other quantities of storage). A virtual page may correspond to a data granularity associated with the type of memory system (e.g., a granularity at which data may be written, read, or both). For example, the virtual page may correspond to a second quantity of storage (e.g., 4 kB for UFS and 512 B for eMMC) from which data may be read or to which data may be written. In some examples, the virtual pages may be referred to as translation units 185 (e.g., data units) and may represent a minimal amount of data pointed to by entries of a flash translation layer (FTL) table. In some cases, logical translation units (e.g., logical addresses of the translation units 185) may be used to indicate data at a logical level (e.g., at a host and controller level), and the translation units 185 may be the physical locations at which the logical data is stored.

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a L2P mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, no data, or a combination thereof. For example, a page 175 may include a subset of valid translation units 185, a subset of invalid translation units 185, a subset of empty translation units 185, or a combination thereof. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations (e.g., a reorganization procedure) that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support weighted VAC for garbage collection. For example, the host system 105 (e.g., a host system controller 106), the memory system 110

(e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

To support garbage collection, a memory system 110 may maintain and update a VAC for each block 170 (e.g., for each virtual block 180) as translation units 185 (e.g., pages 175) of the blocks 170 are written to and marked invalid. Each translation unit 185 may be associated with (e.g., store) a type of data (e.g., a temperature, data associated with different streams or applications), such as hot data, warm data, or cold data, among other types of data. In some examples, separating data by data type (e.g., natively separating out data into different cursors) as it is written to data blocks 170 may add a separate cursor for different data type identifications (e.g., stream identifications) and may utilize an additional operation code. Additionally or alternatively, the memory system 110 may be constrained to writing data to a single block 170 (e.g., single virtual block 180) at a time in response to a write command from the host system 105 (e.g., due to generating and storing parity information in association with redundant array of independent nodes (RAIN) protocols). Thus, the memory system 110 may write data of different types to the block 170 rather than, for example, writing hot data to certain blocks 170 and cold data to other blocks 170. As a result, the blocks 170 may have various percentages of cold translation units 185 (e.g., translation units 185 that store cold data) and hot translation units 185 (e.g., translation units 185 that store hot data).

In some examples, the memory system 110 may be configured to select virtual blocks 180 (e.g., or blocks 170) for garbage collection that have lower VACs. As such, virtual blocks 180 storing relatively higher quantities of hot data may be prioritized for garbage collection, for example, due to having VACs fall more rapidly than virtual blocks 180 storing relatively higher quantities of cold data. As a result, however, destination virtual blocks 180 (e.g., destination blocks 170) may become invalidated more frequently, for example due to the hot data written to the destination virtual blocks 180 being invalidated at a higher rate, thereby resulting in more frequent garbage collection procedures, performance loss, and increased latency.

The techniques described herein enable a memory system 110 to select a data block for reorganization (e.g., garbage collection) based on a weighted VAC (e.g., weighted valid page count) that prioritizes valid translation units 185 (e.g., valid virtual pages) of a data type (e.g., cold data, warm data) associated with becoming invalidated after a longer duration, which will result in a more efficient garbage collection procedure. For example, a memory system 110 (e.g., firmware of the memory system 110) may track the quantities of valid translation units 185 in virtual blocks 180 associated each data type (e.g., maintain and update a stream VAC (SVAC) associated with each data type) and improve garbage collection by prioritizing virtual blocks 180 with a higher percentage of the data type (e.g., cold data). In some implementations, as moving hot data may be a kind of wasted work (e.g., due to a high likelihood of being invalidated shortly thereafter), the prioritization may be based on the weighted VAC that corresponds to a weighted average of the various quantities of translation units 185 in a virtual block 180 in which, for example, an effective (e.g., weighted) quantity of valid translation units 185 associated with the data type may be reduced and an effective quantity of valid translation units 185 associated with a second data type (e.g., hot data) may be increased in computing the weighted average. As a result, the selection of virtual blocks 180 for garbage collection that include a higher percentage of hot data may be delayed, and if the memory system 110 selects such a virtual block 180, it is likely that additional hot translation units 185 will have been overwritten and marked invalid prior to the selection. Accordingly, the fewer valid translation units 185 may be written to a destination virtual block 180 during garbage collection of the virtual block 180, thus reducing garbage collection latency. Additionally, because the garbage collection prioritizes the virtual blocks 180 that include a higher percentage of cold data, destination virtual blocks 180 may maintain a higher VAC for a longer duration, thus resulting in less frequent garbage collection, among other benefits.

FIG. 2 illustrates an example of a system 200 that supports weighted VAC for garbage collection in accordance with examples as disclosed herein. The system 200 may be an example of a system 100 as described with reference to FIG. 1 or aspects thereof. The system 200 may include a memory system 205 configured to store data received from a host system (e.g., a host system 105) in data blocks 210 and to send data from the data blocks 210 to the host system, if requested by the host system using access commands (e.g., read commands or write commands). The data blocks 210 may include various quantities of data units 215 that store portions of the data received from the host system. In the example of FIG. 2, for clarity, the data blocks 210 may include data units 215 (e.g., a translation unit 185, a virtual page, a page 175) that are marked as cold data 220, data units 215 that are marked as warm data 223, and data units 215 that are marked as hot data 225, or both. It is noted, however, that the data blocks 210 may include data units 215 that are associated with a range of temperatures between cold and hot (e.g., warm, various "degrees" of temperature values), where each data temperature is associated with a respective expected life duration of the data (e.g. an expected probability for the data to be invalidated sooner or later). The system 200 may implement aspects of the system 100 as described with reference to FIG. 1. For example, the memory system 205, the data blocks 210, and the data units 215 may be examples of a memory system 110, a virtual block 180 (e.g., or block 170), and a translation unit 185 (e.g., or page 175), respectively.

The memory system 205 may include a quantity of data blocks 210. For example, the memory system 205 may include a data block 210-*a*, a data block 210-*b*, a data block 210-*c*, and a data block 210-*d* (although any quantity of data blocks 210 may be included in the memory system 205). The data blocks 210 may include any quantity of valid data units 215 (e.g., data associated with a valid logical address), invalid data units 215 (e.g., data no longer associated with a valid logical address), empty data units 215 (e.g., unwritten data units 215), or any combination thereof. In the example of FIG. 2, the illustrated data units 215 included in the data blocks 210 may correspond to data units 215 that store valid data (e.g., valid pages), and invalid pages and empty pages that may be included in the data blocks 210 may not be shown. The memory system 205 may track a count of valid addresses (e.g., a VAC) for each data block 210 that indicates the total quantity of valid data units 215 included in the data block 210. In some examples, the VAC for each data block 210 may be represented as or used to compute a ratio (e.g., a percentage) of the total quantity of valid data units 215 in the data block 210 to the total quantity of data units 215 in the data block 210. In some examples, the memory system 205 may maintain a page validity table (PVT) that tracks which data units 215 of the data blocks 210 are valid and which data units 215 are invalid (e.g., or empty).

In some examples, the memory system 205 may utilize the VAC to select a data block 210 for a reorganization procedure. For example, the memory system 205 may select a data block 210 with the lowest VAC (e.g., with the least valid addresses, least valid data) to perform a garbage collection procedure on first. The memory system 205 may similarly select subsequent data blocks 210 based on a greedy procedure (e.g., selecting a next data block 210 for garbage collection with a next lowest VAC). However, selecting data blocks 210 based solely on lowest total VAC without consideration of the quantities of various types of data stored in the data blocks 210 may result in inefficient garbage collection.

The examples described with reference to FIG. 2 may depict examples of data block selection for reorganization procedures utilizing weighted VACs. For example, each data unit 215-a of the data block 210-a may be associated with a data type (e.g., a temperature, a stream). The memory system 205 may determine, for the data block 210-a, a first quantity of valid data units 215-a associated with a first type of data (e.g., hot data) and a second quantity of valid data units 215-a associated with a second type of data (e.g., cold data). For example, the data block 210-a may include six data units 215-a in which four data units 215-a are associated with cold data 220, and two data units 215-a are associated with hot data 225. In some examples, the first quantity of valid data units 215-a and the second quantity of valid data units 215-a may be examples of two different SVACs. That is, the memory system 205 may maintain (e.g., track, update, store) a first SVAC for the data block 210-a that is a count of the first quantity of valid data units 215-a and a second SVAC for the data block 210-a that is a count of the second quantity of valid data units 215-a.

To support selection of the data block 210-a for garbage collection, the memory system 205 may determine a weighted average of the first quantity of valid data units 215-a and the second quantity of valid data units 215-a. For example, the memory system 205 may apply a first weight (e.g., a ratio) associated with the first type of data to the first quantity of valid data units 215-a and a second weight associated with the second type of data to the second quantity of valid data units 215-a. The memory system 205 may compute the weighted average, for example, by averaging the weighted first quantity of valid data units 215-a and the weighted second quantity of valid data units 215-a. In some cases, the weighted average (e.g., a weighted VAC) may be an average of a product of the first quantity of valid data units 215-a and the first weight and a product of the second quantity of valid pages and the second weight, as depicted in Equation 1:

$$W_{avg} = \frac{\text{Hot}(1 + k1) + \text{Cold}(1 - k2)}{2} \quad (1)$$

where $W_{avg}$ represents the weighted average, Hot represents the first quantity of valid data units 215-a, 1+k1 represents the first weight, Cold represents the second quantity of valid data units 215-a, and 1+k2 represents the second weight. Thus, Hot (1+k1) may represent the weighted first quantity of valid data units 215-a, and Cold (1+k2) may represent the weighted second quantity of valid data units 215-a. In some examples, k1 and k2 may be same or different values. It is noted that Equation 1 is provided for purposes of discussion and illustration only, and numerous different examples of calculating the weighted average are possible. For example, k1 and/or k2 may be combined with an integer value different from one, one or more of the weights may be integer values that are added to or subtracted from a respective quantity of valid data units 215, one or more of the weights may be fixed ratios (e.g., 0.8, 1.25, ¾, among other ratios), etc.

In some implementations, the memory system 205 may adjust the first weight, the second weight, or both. For example, the memory system 205 may receive, from a host system (e.g., a host system 105), commands to write respective data to the data units 215 of the data blocks 210 (e.g., the data units 215-a of the data block 210-a). In some cases, the commands may each include an indication that the respective data is associated with either the first type of data or the second type of data (e.g., or some other type of data if additional data types are supported). The memory system 205 may adjust the first weight or the second weight based on an accuracy of the indications (e.g., an accuracy of the indication that the respective data (being associated with the first type of data) is indeed associated with the first type of data or that the respective data (being associated with the second type of data) is indeed associated with the second type of data). For example, if the indication indicates that the data is cold and the data is subsequently overwritten within a duration (e.g., 1 day) such that the data should be considered hot data, the memory system 205 may determine that the indication was inaccurate. Alternatively, if the data is overwritten in accordance with the indicated type of data, the memory system may determine that the indication is accurate. The memory system 205 may dynamically adjust the weights (e.g., using machine learning algorithms) over time (e.g., during a life of the memory system 205), for example, by increasing an effect of the weight (e.g., increasing the coefficients k1 and k2) on a quantity of valid data units 215 as a confidence of an accuracy of data identification increases and decreasing the effect of the weight as the confidence decreases (e.g., decreasing the coefficients k1 and k2).

The memory system 205 may select a data block 210 for a reorganization procedure based on the weighted average (e.g., the weighted valid page count, the weighted VAC) and a selection procedure (e.g., a greedy selection procedure that selects a data block 210 with a minimum VAC relative to other data blocks 210, for example, to minimize an amount of data to be moved). In a first example, the memory system 205 may select the data block 210-a over (e.g., before) the data block 210-b. For example, the data block 210-b may include six data units 215-b in which two data units 215-b are associated with cold data 220, and four data units 215-b are associated with hot data 225. Based on a first hot weight and a second cold weight, a first weighted VAC of the data block 210-a may be less than a second weighted VAC of the data block 210-b. For example, if the first hot weight is 1.2 (e.g., k1=0.2) and the second cold weight is 0.8 (e.g., k2=0.2), the memory system 205 may compute the first weighted VAC, according to Equation 1, to be 5.6 and the second weighted VAC to be 6.4. Thus, the memory system 205 may first select the data block 210-*a* for the reorganization procedure and then select the data block 210-*b* for the reorganization procedure based on the first weighted VAC being less than the second weighted VAC despite each of the blocks 210-*a* and 210-*b* having a total VAC of six.

In a second example, the memory system 205 may select the data block 210-*a* over the data block 210-*c* even though the data block 210-*c* has a smaller total VAC. For example, the data block 210-*c* may include four valid data units 215-*c* in which one data unit 215-*c* is associated with cold data 220, and three data units 215-*c* are associated with hot data 225. Based on a first hot weight and a second cold weight, a first weighted VAC of the data block 210-*a* may be less than a second weighted VAC of the data block 210-*c*. For example, if the first hot weight is 1.6 (e.g., k1=0.6) and the second cold weight is 0.4 (e.g., k2=0.6), the memory system 205 may compute the first weighted VAC, according to Equation 1, to be 4.8 and the second weighted VAC to be 5.2. Thus, by using the weighted VACs to select the data blocks 210 for the reorganization procedure instead of total VACs, the memory system may first select the block 210-*a* for the reorganization procedure and then select the data block 210-*c* for the reorganization procedure based on the first weighted VAC being less than the second weighted VAC.

In a third example, the memory system 205 may select the data block 210-*c* over the data block 210-*a*. For example, if the first hot weight is 1.2 (e.g., k1=0.2) and the second cold weight is 0.8 (e.g., k2=0.2), the memory system 205 may compute the first weighted VAC, according to Equation 1, to be 5.6 and the second weighted VAC to be 4.4. Thus, despite the data block 210-*a* having a greater quantity of cold valid data units 215 than the data block 210-*c*, the weights may be applied such that the second weighted VAC is still less than the first weighted VAC. Accordingly, the memory system 205 may first select the data block 210-*c* for the reorganization procedure and then select the data block 210-*a* for the reorganization procedure based on the second weighted VAC being less than the first weighted VAC. In this example, the memory system 205 may select, after selecting the data block 210-*c*, the data block 210-*a* based on the first weighted VAC of the data block 210-*a* being greater than the second weighted VAC of the data block 210-*c* and less than the weighted VAC of the data block 210-*b* (e.g., 6.4).

In some examples, additional quantities of valid data units 215 associated with additional types of data (e.g., in addition to cold data 220 or hot data 225) may be tracked and considered in computing a weighted VAC associated with a data block 210. For example, the data block 210-*d* may include respective quantities of valid data units 215-*d* associated with cold data 220, warm data 223, and hot data 225 (e.g., among other possible types of data that may be stored by data units 215). The memory system 205 may maintain respective SVACs for each of the respective quantities of valid data units 215-*d* and may determine a weighted average of the respective quantities of valid data units 215-*d* in selecting the data block 210-*d* for garbage collection.

For instance, in a fourth example, the memory system 205 may select the data block 210-*d* over the data block 210-*b*. For example, the memory system 205 may apply a first hot weight, a second cold weight, and a third warm weight (e.g., associated with warm data 223) to corresponding SVACs and compute an average of the weighted SVACs. In this example, if the first hot weight is 1.2 (e.g., k1=0.2), the second cold weight is 0.8 (e.g., k2=0.2), and the third warm weight is 1 (e.g., k3=0), the memory system 205 may compute a first weighted VAC (e.g., according to a modified Equation 1 that considers the quantity of warm data units 215-*d*) of the data block 210-*b* to be 6.4 and a second weighted VAC of the data block 210-*d* to be 5. Thus, the memory system 205 may first select the data block 210-*d* for the reorganization procedure and then select the data block 210-*b* for the reorganization procedure based on the second weighted VAC being less than the first weighted VAC.

In this manner, Equation 1 may be updated to facilitate the inclusion of a variety (e.g., multiple, a range) of types of data (e.g., very cold, cold, somewhat cold, warm, somewhat hot, hot, very hot, and the like), where the memory system 205 may track multiple (e.g., more than two) quantities of valid data units 215, and select garbage collection source data blocks 210 using a weighted combination of the quantities of valid data units 215. In some examples, weights may decrease as the data decreases in temperature (e.g., becomes colder). That is, as data becomes colder, the weight associated with the data type may become closer to 0. For example, a hot weight may be greater than a warm weight (e.g., 1.2>1.0), and a warm weight may be greater than a cold weight (e.g., 1.0>0.8).

While described primarily with reference to a greedy selection procedure and a same value for the k coefficients, the described examples may also relate to other types of selection procedures with different weights or coefficient values. For example, the memory system may select a data block 210 based on a recursive method, a smart method, or the like. In some cases, the host system may indicate to the memory system 205 what weights to use, the weights may be pre-configured at the memory system 205 (e.g., during a manufacturing stage of the memory system 205), or the memory system 205 may determine the weights based on a confidence of data type indication accuracy.

FIGS. 3A and 3B illustrate examples of a configuration 300-*a* and a configuration 300-*b*, respectively, that support weighted VACs for garbage collection in accordance with examples as disclosed herein. In some examples, the configuration 300-*a* and the configuration 300-*b* may be examples of or implement aspects of a system 100, a system 200, or both, as described herein with reference to FIGS. 1 and 2. For example, a data block 305 and a data unit 310 may be examples of or included as part of a virtual block 180 or a data block 210 and a translation unit 185 or a data unit 215, respectively, included in a memory system (e.g., a memory system 110, a memory system 205).

The configurations 300 may include one or more data blocks 305 including multiple data units 310 that include various types of data (e.g., hot data, cold data, warm data, data streams, among other types of data). For example, the data units 310 may include valid data 315, invalid data 320, cold data 325, warm data 327, hot data 330, empty data 335 (e.g., no data), a bitmap 340 (e.g., a colored PVT bitmap), or any combination thereof. Additional or different types of data may be stored by the data units 310. In some implementations, the configurations 300 may have additional types or quantities of components, and/or some components may be absent from the configurations 300. For example, the data blocks 305 may include various configurations of pages, various quantities of pages, etc.

In the example of FIG. 3A, the data block 305-*a* of the memory system may include data units 310-*a*. In some cases, the memory system may support multi pass garbage collection with colored PVT. For example, the data units 310-*a* may optionally include a bitmap 340. For example, the bitmap 340 may be stored in one or more of the data units 310-*a* (e.g., at the end of the data block 305-*a* after all of the previous data units 310-*a* are written, including the empty data 335 (e.g., with dummy data)) or the bitmap 340 may be stored externally to the data block 305-*a* (e.g., in SRAM of the memory system, in another data block 305, another memory system 205). The bitmap 340 may be an example of a data structure that tracks respective types of data associated with pages of the data block 305-*a*, which may be referred to as colors (e.g., a data unit 310-*a* storing cold data 325 may be associated with a first color, a data unit 310-*a* storing warm data 327 may be associated with a second color, and a data unit 310-*a* storing hot data 330 may be associated with a third color). For example, the bitmap 340 may include indications of the type of data (e.g., whether each data unit 310-*a* includes cold data 325, warm data 327, or hot data 330, among other levels of data "temperature") associated with each data unit 310-*a* including valid data 315 and each data unit 310-*a* including invalid data 320. In some cases, the bitmap 340 may not include indications associated with empty data units 310-*a*. To support multi pass garbage collection, the memory system may read (e.g., reference) the bitmap 340 while writing valid data from a source block 305 to a destination block 305 to determine the type associated with the valid data. The memory system may write valid data associated with a first type of data (e.g., cold data 325) to a first destination block 305, valid data associated with a second type of data (e.g., warm data 327) to a second destination block 305, valid data associated with a third type of data (e.g., hot data 330) to a third destination block 305, and so on.

In some implementations, the memory system may track one or more quantities of valid data units 310-*a* (e.g., SVACs) for each type of data associated with the data block 305-*a*. For example, the memory system may receive, from a host system (e.g., a host system 105), a command to write data to a data unit 310-*a* of the data block 305-*a* that includes an indication of a type of the data. The memory system may increment a first quantity of valid pages (e.g., a first SVAC) associated with a first type of data (e.g., cold data 325), or a second quantity of valid pages (e.g., a second SVAC) associated with a second type of data (e.g., hot data 330), and so on, based on the type of data indicated by the command. For example, if the command indicates the first type of data, the memory system may write the data to an empty data unit 310-*a* (e.g., a data unit 310-*a* with empty data 335) and increase the first quantity of valid pages accordingly (e.g., increment the first SVAC). If the command indicates the second type of data, the memory system may write the data to an empty data unit 310-*a* and increase the second quantity of valid pages accordingly (e.g., increment the second SVAC). If the command indicates another type of data (e.g., a third type of data, such as warm data 327), the memory system may write the data to an empty data unit 310-*a* and increase a third quantity of valid pages accordingly (e.g., increment a third SVAC), and so on.

In some examples, the memory system may use the bitmap 340 to update the SVACs (e.g., the first SVAC, the second SVAC, among other SVACs maintained by the memory system), for example, in response to one or more data units 310-*a* being marked as invalid. For instance, the memory system may use the bitmap 340 to determine a first quantity of invalid data units 310-*a* that are associated with the first type of data and a second quantity of invalid data units 310-*a* that are associated with the second type of data. For example, the memory system may determine a first valid page count associated with the first type of data (e.g., a current value of the first SVAC) and a second valid page count associated with the second type of data (e.g., a current value of the second SVAC). The memory system may access the bitmap 340 (e.g., and a PVT that tracks which data units 310-*a* are invalid and which are valid) to determine which data units 310-*a* that were marked as invalid since a last update to the first SVAC were used to store the first type of data and which data units 310-*a* that were marked as invalid since a last update to the second SVAC were used to store the second type of data. The memory system may determine the first quantity of valid data units 310-*a* (e.g., update the first SVAC) based on a difference between the first valid page count and the first quantity of invalid data units 310-*a*. That is, the memory system may compute and update the first SVAC to be the difference between the current value of the first SVAC and the quantity of data units 310-*a* used to store the first type of data that were marked as invalid since the current value of the first SVAC was computed. Similarly, the memory system may determine the second quantity of valid data units 310-*a* (e.g., update the second SVAC) based on a difference between the second valid page count and the second quantity of invalid data units 310-*a*. The memory system may similarly update other SVACs maintained by the memory system using the bitmap 340.

In some examples, the memory system may perform a logical operation (e.g., an XOR operation) between the bits of the PVT corresponding to the invalid data units 310 and the corresponding bits of the bitmap 340, count the quantity of each type of output (e.g., quantities of 0 bits output, and quantities of 1 bits output), and decrement the SVACs by the corresponding quantities. That is, the memory system may determine which data units 310-*a* were marked as invalid since the last calculation of the quantities of valid data units 310-*a*, read the bitmap 340 to determine the types of data of the invalidated data units 310-*a*, and decrement the respective quantities of valid data units 310-*a* (e.g., respective SVACs) based on a quantity of data units 310-*a* associated with each type of data marked invalid.

In some cases, determining the quantities of valid pages (e.g., updating the SVACs) may have an overhead (e.g., a latency associated with calculating the SVAC based on accessing the colored (static) PVT bitmap 340 for each deallocated data unit 310-*a*). In some implementations, the memory system may determine (e.g., update, calculate) the quantities of valid data units 310-*a* based on a communication between the host system and the memory system. For example, the memory system may receive, from the host system, a command indicating to calculate the quantities of valid data units 310-*a* when there is reduced (e.g., minimal, no) impact to user experience (e.g., at night when File System is performing maintenance). Additionally, or alternatively, such as to limit the latency impact (the overhead), and because the SVAC is used for selecting a data block 305 for garbage collection, the memory system may determine the quantities of valid data units 310-*a* if about to perform a garbage collection procedure. In some implementations, the memory system may update the quantities of valid data units 310-*a* in real time (e.g., reading the bitmap 340 after marking a data unit 310-*a* as invalid and decrementing the corresponding quantity of valid data units 310-*a*).

The memory system may use the quantities of valid data units 310-*a* in selecting the data block 305-*a* for garbage collection. For example, if performing a garbage collection procedure, the memory system may apply respective weights to respective quantities of valid data units 310-*a* to compute a weighted VAC of the data block 305-*a* and select the data block 305-*a* in accordance with the weighted VAC.

In the example of FIG. 3B, the memory system may track and update quantities of valid data units 310 (e.g., SVACs)

using L2P change records 360. For example, the configuration 300-*b* depicts a set of L2P change records 360 (e.g., indications of changes to L2P pointers) that include at least a logical address field 345 and a physical address field 350, which may be used in writing data associated with a logical address (e.g., a logical block address (LBA)) to a physical address (e.g., a new physical address different from a previous physical address). For example, the host system may transmit a command to the memory system to write (e.g., update, overwrite) data associated with the logical address. In the example of FIG. 3, the data associated with the logical address was previously written to one or more data units 310-*b* of a data block 305-*b* and a mapping of the logical address to physical addresses of the one or more data units 310-*b* may be stored in an L2P table. In response to the command, the memory system may write the data to one or more empty data units 310-*c* of a data block 305-*c*. As part of writing the data to the one or more empty data units 310-*c*, the memory system may generate an L2P change record 360 that includes a logical address field 345 with the logical address of the data and a physical address field 350 with the physical addresses of the one or more empty data units 310-*c*. The memory system may use the L2P change record 360 to update the L2P table to indicate that the data associated with the logical address is now stored at the one or more data units 310-*c* in the data block 305-*c*. The memory system may also update the one or more source data units 310-*b* (e.g., the one or more data units 310-*b* where the data was stored) to be marked as storing invalid data 320 and the one or more destination data units 310-*c* (e.g., the one or more data units 310-*c* where the data is now stored) to be marked as storing valid data 315.

In some implementations, an L2P change record 360 may include an indication of a type of the data associated with the command. For example, the L2P change record 360 may include an L2P record 365 that includes a physical address field 350 (e.g., a pointer) and a flag 355 (e.g., a stream identification field) that indicates the type of the data associated with the logical address. The L2P record may be used in updating an L2P table. For example, the logical field address 345 of an L2P change record 360 may be used to determine (e.g., identify, retrieve) an entry of the L2P table to be updated that corresponds to the logical address included in the logical field address 345. To update the L2P table, the memory system may replace the determined entry with the L2P record 365.

The memory system may track respective quantities of valid data units 310-*b* (e.g., respective SVACs) of the data block 305-*b* based on the flag 355 included in the L2P record 365. For example, the memory system may determine the type of data stored by the one or more source data units 310-*b* by reading the flag 355 of the L2P record 365 and decrease (e.g., decrement) a corresponding SVAC by the quantity of one or more source data units 310-*b* (e.g., in conjunction with marking the one or more source data units 310-*b* as invalid). For instance, the flag 355 may indicate whether the data units 310-*b* to be marked as invalid are hot or cold data units 310 (among other possible temperatures). Accordingly, the corresponding SVACs (e.g., the SVACs pertaining to either the hot data 330, the warm data 327, or the cold data 325, among other data types) may be decremented in conjunction with the data units 310-*b* being marked as invalid.

In some cases, the L2P change records 360 may include a portion (e.g., one or more bits) of a data type indication (e.g., a stream identification value) or an entirety of the indication. For example, a flag 355 of a first L2P change record 360 may include a first portion (e.g., one or more first bits) of the indication, a flag 355 of a second L2P change record 360 may include a second portion (e.g., one or more second bits) of the indication, and so on, such as for supporting a greater quantity of possible stream identifications (e.g., various temperatures, types of data). Here, the memory system may determine that the data type indication indicated by the combination of multiple stream identification bits fields 355 is applicable to the logical addresses (e.g., LBAs) of each of the L2P change records 360 across which the data type indication is included and decrement corresponding SVACs accordingly. That is, the memory system may determine that the data units 310 of one or more data blocks 305 to be marked as invalid based on the L2P change records 360 may each be associated with the indicated data type and decrement SVACs for the one or more data blocks corresponding to the data type. Alternatively, each L2P change record 360 may include a respective data type indication.

In some cases, the data type indication may be a single bit in length or multiple bits in length, based on a quantity of supported types of data that may be indicated. In some cases, including portions of the data type indication across multiple L2P change records 360 may be a type of compressing technique. In some examples, the LBAs indicated by the logical address fields 345 of multiple L2P change records 360 used to indicate the portions of the data type indication may be disparate (e.g., associated with different types of data). Here, an undetermined stream identification value may be introduced. That is, the stream identification value may indicate that the data type associated with the LBAs is undetermined (e.g., that not all of the LBAs are associated with the same type of data). Here, the memory system may use an alternative technique, such as accessing a colored PVT bitmap (e.g., a bitmap 340), to determine the type of data associated with each data unit 310 that is marked invalid and update corresponding SVACs accordingly.

In some cases, the memory system may determine a weighted VAC of a data block 305 based on the determined (tracked) quantity of valid data units 310 (the SVACs). In some examples, the memory system may select a data block 305 for a reorganization procedure based on the weighted VAC, as described herein with reference to FIG. 2, and perform the reorganization procedure on the selected data block 305.

Figure 4:
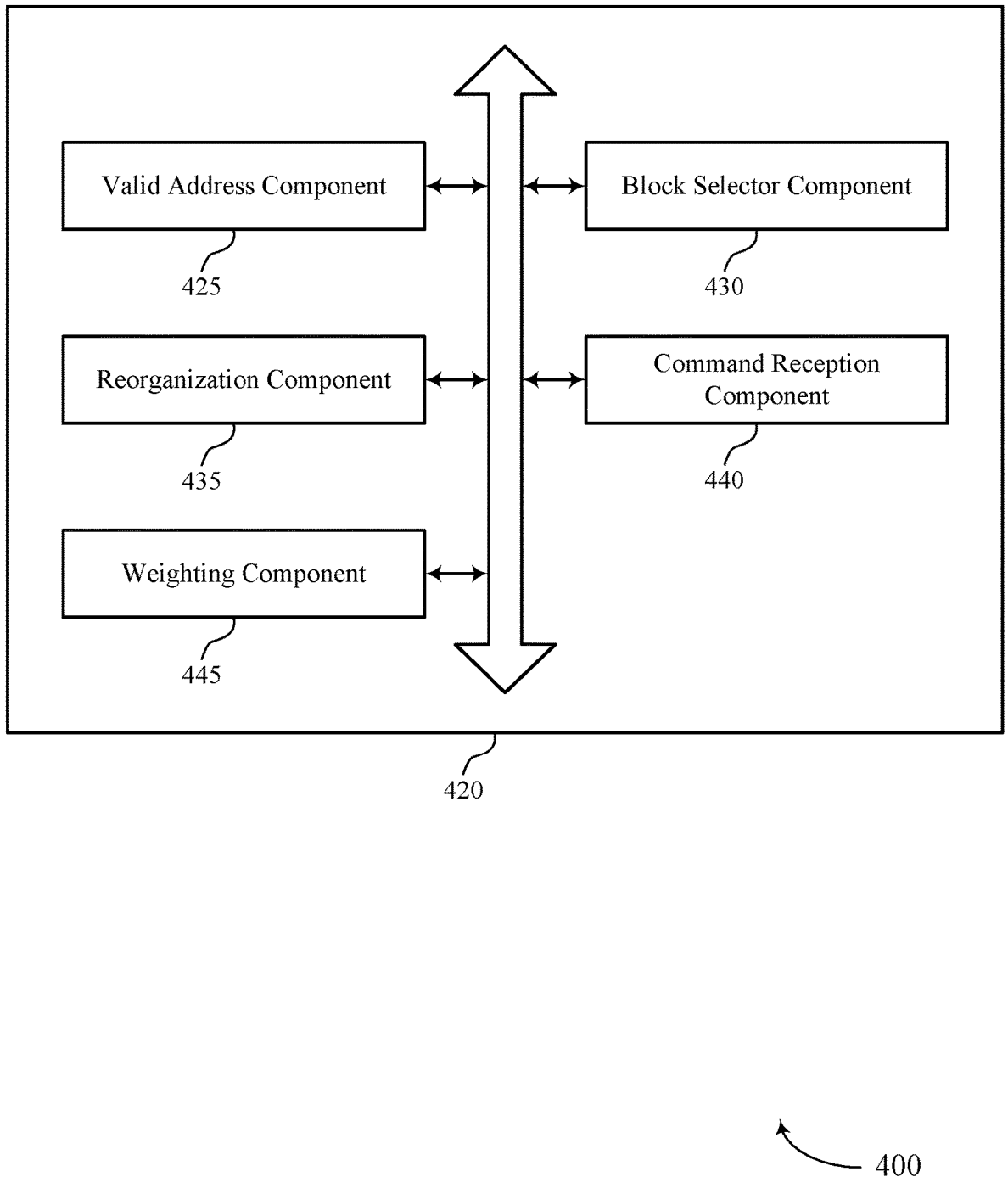
FIG. 4 shows a block diagram of a memory system that supports weighted VAC for garbage collection in accordance with examples as disclosed herein.

FIG. 4 shows a block diagram 400 of a memory system 420 that supports weighted VAC for garbage collection in accordance with examples as disclosed herein. The memory system 420 may be an example of aspects of a memory system as described with reference to FIGS. 1 through 3. The memory system 420, or various components thereof, may be an example of means for performing various aspects of weighted VAC for garbage collection as described herein. For example, the memory system 420 may include a valid address component 425, a block selector component 430, a reorganization component 435, a command reception component 440, a weighting component 445, or any combination thereof. Each of these components may communicate, directly or indirectly, with one another (e.g., via one or more buses).

The valid address component 425 may be configured as or otherwise support a means for determining, for a data block of a plurality of data blocks, a first quantity of valid data units (e.g., valid pages, valid virtual pages) of the data block associated with a first type of data and a second quantity of valid data units of the data block associated with a second type of data. The block selector component 430 may be configured as or otherwise support a means for selecting the data block from the plurality of data blocks for a reorganization procedure based at least in part on a weighted VAC (e.g., valid page count) of the data block that is determined based at least in part on a weighted average of the first quantity of valid data units of the data block and the second quantity of valid data units of the data block. The reorganization component 435 may be configured as or otherwise support a means for performing the reorganization procedure on the selected data block.

In some examples, the block selector component 430 may be configured as or otherwise support a means for selecting, after selecting the data block, a second data block of the plurality of data blocks for the reorganization procedure based at least in part on a weighted VAC of the second data block being greater than the weighted VAC of the data block, where a total VAC of the second data block is less than a total VAC of the data block.

In some examples, the valid address component 425 may be configured as or otherwise support a means for determining, for the data block, one or more additional quantities of valid data units of the data block associated with one or more additional types of data, where the weighted valid address count of the data block is determined based at least in part on a weighted average of the first quantity of valid data units of the data block, the second quantity of valid data units of the data block, and the one or more additional quantities of valid data units of the data block.

In some examples, the command reception component 440 may be configured as or otherwise support a means for receiving, from a host system, a command to write data to a data unit of the data block, the command including an indication of a type of the data. In some examples, the valid address component 425 may be configured as or otherwise support a means for incrementing the first quantity of valid data units or the second quantity of valid data units based at least in part on the type of data indicated by the command.

In some examples, the weighting component 445 may be configured as or otherwise support a means for determining the weighted average based at least in part on applying a first weight associated with the first type of data to the first quantity of valid data units and applying a second weight associated with the second type of data to the second quantity of valid data units.

In some examples, the command reception component 440 may be configured as or otherwise support a means for receiving, from a host system, a plurality of commands to write respective data to a plurality of data units of the data block, where each command includes an indication that the respective data is associated with the first type of data. In some examples, the weighting component 445 may be configured as or otherwise support a means for adjusting the first weight based at least in part on an accuracy of the indication that the respective data is associated with the first type of data.

In some examples, the command reception component 440 may be configured as or otherwise support a means for receiving, from a host system, a plurality of commands to write respective data to a plurality of data units of the data block, where each command includes an indication that the respective data is associated with the second type of data. In some examples, the weighting component 445 may be configured as or otherwise support a means for adjusting the second weight based at least in part on an accuracy of the indication that the respective data is associated with the second type of data.

In some examples, the weighted average is an average of a product of the first quantity of valid data units and the first weight and a product of the second quantity of valid data units and the second weight.

In some examples, the first weight is greater than the second weight based at least in part on a likelihood of the first type of data being overwritten being greater than a likelihood of the second type of data being overwritten.

In some examples, the valid address component 425 may be configured as or otherwise support a means for determining a first VAC of the data block associated with the first type of data and a second VAC of the data block associated with the second type of data. In some examples, the valid address component 425 may be configured as or otherwise support a means for determining, based at least in part on accessing a data structure that tracks respective types of data associated with data units of the data block, a first quantity of invalid data units of the data block associated with the first type of data and a second quantity of invalid pages of the data block associated with the second type of data. In some examples, the first quantity of valid data units corresponds to a difference between the first VAC and the first quantity of invalid data units and the second quantity of valid data units corresponds to a difference between the second VAC and the second quantity of invalid data units.

In some examples, the valid address component 425 may be configured as or otherwise support a means for receiving, from a host system, a command indicating to calculate the first quantity of valid data units and the second quantity of valid data units, where the determination of the first quantity of valid data units and the second quantity of valid data units is based at least in part on the command.

In some examples, the command reception component 440 may be configured as or otherwise support a means for receiving, from a host system, one or more commands to write data to one or more data units of one or more other data blocks of the plurality of data blocks, the one or more commands including one or more logical addresses associated with the data. In some examples, the valid address component 425 may be configured as or otherwise support a means for marking one or more data units of the data block as invalid based at least in part on the one or more data units storing previously written data associated with the one or more logical addresses. In some examples, the valid address component 425 may be configured as or otherwise support a means for decrementing the first quantity of valid data units or the second quantity of valid data units based at least in part on an indication of a type of data associated with the data included in one or more L2P records associated with writing respective data to the one or more data units of the one or more other data blocks.

In some examples, a plurality of L2P records each include one or more respective bits of the indication of the type of data.

In some examples, an L2P data unit of the one or more L2P records includes a plurality of bits associated with the indication of the type of data.

In some examples, the first type of data is hot data and the second type of data is cold data, the hot data associated with a higher invalid frequency than the cold data.

Figure 5:
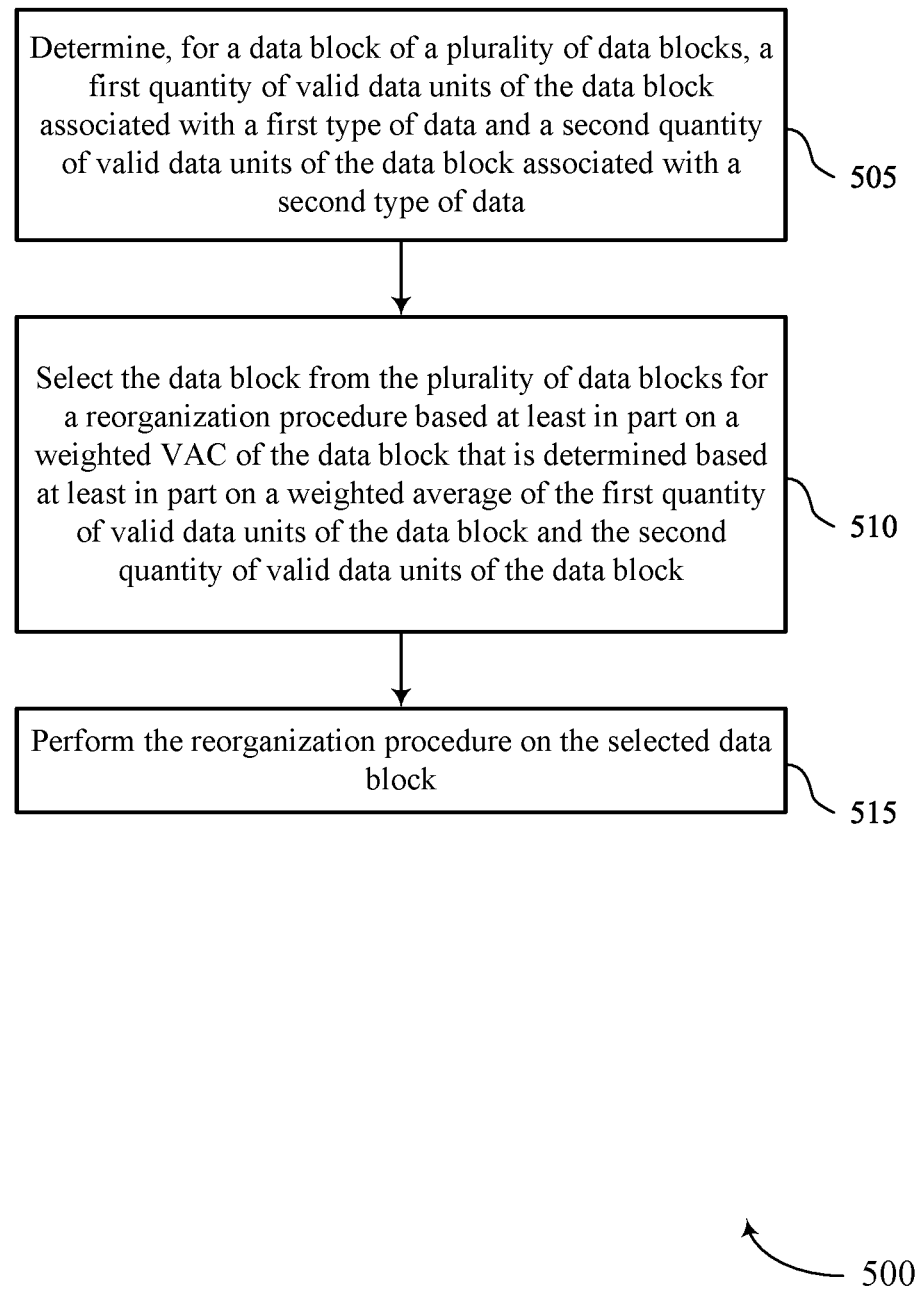
FIG. 5 shows a flowchart illustrating a method or methods that support weighted VAC for garbage collection in accordance with examples as disclosed herein.

FIG. 5 shows a flowchart illustrating a method 500 that supports weighted VAC for garbage collection in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include determining, for a data block of a plurality of data blocks, a first quantity of valid data units (e.g., valid pages, valid virtual pages) of the data block associated with a first type of data and a second quantity of valid data units of the data block associated with a second type of data. The operations of 505 may be performed in accordance with examples as disclosed herein. In some examples, aspects of the operations of 505 may be performed by a valid address component 425 as described with reference to FIG. 4.

At 510, the method may include selecting the data block from the plurality of data blocks for a reorganization procedure based at least in part on a weighted VAC (e.g., a weighted valid page count) of the data block that is determined based at least in part on a weighted average of the first quantity of valid data units of the data block and the second quantity of valid data units of the data block. The operations of 510 may be performed in accordance with examples as disclosed herein. In some examples, aspects of the operations of 510 may be performed by a block selector component 430 as described with reference to FIG. 4.

At 515, the method may include performing the reorganization procedure on the selected data block. The operations of 515 may be performed in accordance with examples as disclosed herein. In some examples, aspects of the operations of 515 may be performed by a reorganization component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining, for a data block of a plurality of data blocks, a first quantity of valid data units of the data block associated with a first type of data and a second quantity of valid data units of the data block associated with a second type of data; selecting the data block from the plurality of data blocks for a reorganization procedure based at least in part on a weighted VAC of the data block that is determined based at least in part on a weighted average of the first quantity of valid data units of the data block and the second quantity of valid data units of the data block; and performing the reorganization procedure on the selected data block.

Aspect 2: The method, apparatus, or non-transitory computer-readable medium of aspect 1, further including operations, features, circuitry, logic, means, or instructions, or any combination thereof for selecting, after selecting the data block, a second data block of the plurality of data blocks for the reorganization procedure based at least in part on a weighted VAC of the second data block being greater than the weighted VAC of the data block, where a total VAC of the second data block is less than a VAC of the data block.

Aspect 3: The method, apparatus, or non-transitory computer-readable medium of any of aspects 1 through 2, further including operations, features, circuitry, logic, means, or instructions, or any combination thereof for determining, for the data block, one or more additional quantities of valid data units of the data block associated with one or more additional types of data, where the weighted valid address count of the data block is determined based at least in part on a weighted average of the first quantity of valid data units of the data block, the second quantity of valid data units of the data block, and the one or more additional quantities of valid data units of the data block.

Aspect 4: The method, apparatus, or non-transitory computer-readable medium of any of aspects 1 through 3, further including operations, features, circuitry, logic, means, or instructions, or any combination thereof for receiving, from a host system, a command to write data to a data unit of the data block, the command including an indication of a type of the data and incrementing the first quantity of valid data units or the second quantity of valid data units based at least in part on the type of data indicated by the command.

Aspect 5: The method, apparatus, or non-transitory computer-readable medium of any of aspects 1 through 4, further including operations, features, circuitry, logic, means, or instructions, or any combination thereof for determining the weighted average based at least in part on applying a first weight associated with the first type of data to the first quantity of valid data units and applying a second weight associated with the second type of data to the second quantity of valid data units.

Aspect 6: The method, apparatus, or non-transitory computer-readable medium of aspect 5, further including operations, features, circuitry, logic, means, or instructions, or any combination thereof for receiving, from a host system, a plurality of commands to write respective data to a plurality of data units of the data block, where each command includes an indication that the respective data is associated with the first type of data and adjusting the first weight based at least in part on an accuracy of the indication that the respective data is associated with the first type of data.

Aspect 7: The method, apparatus, or non-transitory computer-readable medium of any of aspects 5 through 6, further including operations, features, circuitry, logic, means, or instructions, or any combination thereof for receiving, from a host system, a plurality of commands to write respective data to a plurality of data units of the data block, where each command includes an indication that the respective data is associated with the second type of data and adjusting the second weight based at least in part on an accuracy of the indication that the respective data is associated with the second type of data.

Aspect 8: The method, apparatus, or non-transitory computer-readable medium of any of aspects 5 through 7, where the weighted average is an average of a product of the first quantity of valid data units and the first weight and a product of the second quantity of valid data units and the second weight.

Aspect 9: The method, apparatus, or non-transitory computer-readable medium of any of aspects 5 through 8, where the first weight is greater than the second weight based at least in part on a likelihood of the first type of data being overwritten being greater than a likelihood of the second type of data being overwritten.

Aspect 10: The method, apparatus, or non-transitory computer-readable medium of any of aspects 1 through 9, further including operations, features, circuitry, logic, means, or instructions, or any combination thereof for determining a first VAC of the data block associated with the first type of data and a second VAC of the data block associated with the second type of data; determining, based at least in part on accessing a data structure that tracks respective types of data associated with pages of the data block, a first quantity of invalid data units of the data block associated with the first type of data and a second quantity of invalid data units of the data block associated with the second type of data; and where the first quantity of valid data units corresponds to a difference between the first VAC and the first quantity of invalid data units and the second quantity of valid pages corresponds to a difference between the second VAC and the second quantity of invalid data units.

Aspect 11: The method, apparatus, or non-transitory computer-readable medium of aspect 10, further including operations, features, circuitry, logic, means, or instructions, or any combination thereof for receiving, from a host system, a command indicating to calculate the first quantity of valid data units and the second quantity of valid data units, where the determination of the first quantity of valid data units and the second quantity of valid data units is based at least in part on the command.

Aspect 12: The method, apparatus, or non-transitory computer-readable medium of any of aspects 1 through 9, further including operations, features, circuitry, logic, means, or instructions, or any combination thereof for receiving, from a host system, one or more commands to write data to one or more data units of one or more other data blocks of the plurality of data blocks, the one or more commands including one or more logical addresses associated with the data; marking one or more data units of the data block as invalid based at least in part on the one or more data units storing previously written data associated with the one or more logical addresses; and decrementing the first quantity of valid data units or the second quantity of valid data units based at least in part on an indication of a type of data associated with the data included in one or more L2P records associated with writing the respective data to the one or more of the one or more other data blocks.

Aspect 13: The method, apparatus, or non-transitory computer-readable medium of aspect 12, where a plurality of L2P records each include one or more respective bits of the indication of the type of data.

Aspect 14: The method, apparatus, or non-transitory computer-readable medium of any of aspects 12 through 13, where an L2P record of the one or more L2P records includes a plurality of bits associated with the indication of the type of data.

Aspect 15: The method, apparatus, or non-transitory computer-readable medium of any of aspects 1 through 14, where the first type of data is hot data and the second type of data is cold data, the hot data associated with a higher invalid frequency than the cold data.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 16: An apparatus, including: a memory device; and a controller coupled with the memory device and configured to cause the apparatus to: determine, for a data block of a plurality of data blocks, a first quantity of valid data units of the data block associated with a first type of data and a second quantity of valid data units of the data block associated with a second type of data; select the data block from the plurality of data blocks for a reorganization procedure based at least in part on a weighted VAC of the data block that is determined based at least in part on a weighted average of the first quantity of valid data units of the data block and the second quantity of valid data units of the data block; and perform the reorganization procedure on the selected data block.

Aspect 17: The apparatus of aspect 16, where the controller is further configured to cause the apparatus to: select, after selecting the data block, a second data block of the plurality of data blocks for the reorganization procedure based at least in part on a weighted VAC of the second data block being greater than the weighted VAC of the data block, where a total VAC of the second data block is less than a total VAC of the data block.

Aspect 18: The apparatus of any of aspects 16 through 17, where the controller is further configured to cause the apparatus to: receive, from a host system, a command to write data to a data unit of the data block, the command including an indication of a type of the data; and increment the first quantity of valid data units or the second quantity of valid data units based at least in part on the type of data indicated by the command.

Aspect 19: The apparatus of any of aspects 16 through 18, where the controller is further configured to cause the apparatus to: determine the weighted average based at least in part on the controller being configured to cause the apparatus to apply a first weight associated with the first type of data to the first quantity of valid data units and to apply a second weight associated with the second type of data to the second quantity of valid data units.

Aspect 20: The apparatus of aspect 19, where the controller is further configured to cause the apparatus to: receive, from a host system, a plurality of commands to write respective data to a plurality of data units of the data block, where each command includes an indication that the respective data is associated with the first type of data; and adjust the first weight based at least in part on an accuracy of the indication that the respective data is associated with the first type of data.

Aspect 21: The apparatus of any of aspects 19 through 20, where the controller is further configured to cause the apparatus to: receive, from a host system, a plurality of commands to write respective data to a plurality of data units of the data block, where each command includes an indication that the respective data is associated with the second type of data; and adjust the second weight based at least in part on an accuracy of the indication that the respective data is associated with the second type of data.

Aspect 22: The apparatus of any of aspects 19 through 21, where the weighted average is an average of a product of the first quantity of valid data units and the first weight and a product of the second quantity of valid data units and the second weight.

Aspect 23: The apparatus of any of aspects 16 through 22, where the controller is further configured to cause the apparatus to: determine a first VAC of the data block associated with the first type of data and a second VAC of the data block associated with the second type of data; and determine, based at least in part on accessing a data structure that tracks respective types of data associated with pages of the data block, a first quantity of invalid data units of the data block associated with the first type of data and a second quantity of invalid data units of the data block associated with the second type of data, where the first quantity of valid data units corresponds to a difference between the first VAC and the first quantity of invalid data units and the second quantity of valid data units corresponds to a difference between the second VAC and the second quantity of invalid data units.

Aspect 24: The apparatus of aspect 23, where the controller is further configured to cause the apparatus to: receive, from a host system, a command indicating to calculate the first quantity of valid data units and the second quantity of valid data units, where the determination of the first quantity of valid data units and the second quantity of valid data units is based at least in part on the command.

Aspect 25: The apparatus of any of aspects 16 through 22, where the controller is further configured to cause the apparatus to: receive, from a host system, one or more commands to write data to one or more data units of one or more other data blocks of the plurality of data blocks, the one or more commands including one or more logical addresses associated with the data; mark one or more data units of the data block as invalid based at least in part on the one or more data units storing previously written data associated with the one or more logical addresses; and decrement the first quantity of valid data units or the second quantity of valid data units based at least in part on an indication of a type of data associated with the data included in one or more L2P records associated with writing respective data to the one or more data units of the one or more other data blocks.

Aspect 26: The apparatus of aspect 25, where a plurality of L2P records each include one or more respective bits of the indication of the type of data.

Aspect 27: The apparatus of any of aspects 25 through 26, where an L2P record of the one or more L2P records includes a plurality of bits associated with the indication of the type of data.

Aspect 28: The apparatus of any of aspects 16 through 27, where the first type of data is hot data and the second type of data is cold data, the hot data associated with a higher invalid frequency than the cold data.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and
   processing circuitry coupled with the one or more memory devices and configured to cause the memory system to:
   determine, for a first data block of a plurality of data blocks, a first quantity of valid data units of the first data block associated with a first type of data and a second quantity of valid data units of the first data block associated with a second type of data;
   apply, to the first quantity of valid data units, a first weight associated with the first type of data to determine a weighted first quantity of valid data units of the first data block;
   apply, to the second quantity of valid data units, a second weight associated with the second type of data to determine a weighted second quantity of valid data units of the first data block;
   select the first data block from the plurality of data blocks for a reorganization procedure in accordance with a weighted valid address count of the first data block that is determined in accordance with an average of the weighted first quantity of valid data units of the first data block and the weighted second quantity of valid data units of the first data block;

perform the reorganization procedure on the first data block in response to selecting the first data block; and select a second data block of the plurality of data blocks for the reorganization procedure, wherein the second data block is selected after the first data block is selected in accordance with a weighted valid address count of the second data block being greater than the weighted valid address count of the first data block.

2. The memory system of claim 1, wherein a total valid address count of the second data block is less than a total valid address count of the first data block.

3. The memory system of claim 1, wherein the processing circuitry is further configured to cause the memory system to:

determine, for the first data block, one or more additional quantities of valid data units of the first data block associated with one or more additional types of data, wherein the weighted valid address count of the first data block is determined in accordance with a weighted average of the first quantity of valid data units of the first data block, the second quantity of valid data units of the first data block, and the one or more additional quantities of valid data units of the first data block.

4. The memory system of claim 1, wherein the processing circuitry is further configured to cause the memory system to:

receive, from a host system, a command to write data to a data unit of the first data block, the command comprising an indication of a type of the data; and increment the first quantity of valid data units or the second quantity of valid data units in accordance with the type of data indicated by the command.

5. The memory system of claim 1, wherein the processing circuitry is further configured to cause the memory system to:

receive, from a host system, a plurality of commands to write respective data to a plurality of data units of the first data block, wherein each command comprises an indication that the respective data is associated with the first type of data; and adjust the first weight in accordance with an accuracy of the indication that the respective data is associated with the first type of data.

6. The memory system of claim 1, wherein the processing circuitry is further configured to cause the memory system to:

receive, from a host system, a plurality of commands to write respective data to a plurality of data units of the first data block, wherein each command comprises an indication that the respective data is associated with the second type of data; and adjust the second weight in accordance with an accuracy of the indication that the respective data is associated with the second type of data.

7. The memory system of claim 1, wherein the average of the weighted first quantity of valid data units and the weighted second quantity of valid data units is the average of a product of the first quantity of valid data units and the first weight and a product of the second quantity of valid data units and the second weight.

8. The memory system of claim 1, wherein the first weight is greater than the second weight in accordance with a likelihood of the first type of data being overwritten being greater than a likelihood of the second type of data being overwritten.

9. The memory system of claim 1, wherein the processing circuitry is further configured to cause the memory system to:

determine a first valid address count of the first data block associated with the first type of data and a second valid address count of the first data block associated with the second type of data; and determine, in response to accessing a data structure that tracks respective types of data associated with pages of the first data block, a first quantity of invalid data units of the first data block associated with the first type of data and a second quantity of invalid data units of the first data block associated with the second type of data, wherein the first quantity of valid data units corresponds to a difference between the first valid address count and the first quantity of invalid data units and the second quantity of valid data units corresponds to a difference between the second valid address count and the second quantity of invalid data units.

10. The memory system of claim 9, wherein the processing circuitry is further configured to cause the memory system to:

receive, from a host system, a command indicating to calculate the first quantity of valid data units and the second quantity of valid data units, wherein the determination of the first quantity of valid data units and the second quantity of valid data units is in response to the command.

11. The memory system of claim 1, wherein the processing circuitry is further configured to cause the memory system to:

receive, from a host system, one or more commands to write data to one or more data units of one or more other data blocks of the plurality of data blocks, the one or more commands comprising one or more logical addresses associated with the data;

mark one or more data units of the first data block as invalid in accordance with the one or more data units storing previously written data associated with the one or more logical addresses; and decrement the first quantity of valid data units or the second quantity of valid data units in accordance with an indication of a type of data associated with the data included in one or more logical-to-physical records associated with writing respective data to the one or more data units of the one or more other data blocks.

12. The memory system of claim 11, wherein a plurality of logical-to-physical records each include one or more respective bits of the indication of the type of data.

13. The memory system of claim 11, wherein a logical-to-physical record of the one or more logical-to-physical records includes a plurality of bits associated with the indication of the type of data.

14. The memory system of claim 1, wherein the first type of data is hot data and the second type of data is cold data, the hot data associated with a higher invalid frequency than the cold data.

15. A non-transitory computer-readable medium storing code comprising instructions which, when executed by one or more processors of memory system, cause the memory system to:

determine, for a first data block of a plurality of data blocks, a first quantity of valid data units of the first data block associated with a first type of data and a second quantity of valid data units of the first data block associated with a second type of data;

apply, to the first quantity of valid data units, a first weight associated with the first type of data to determine a weighted first quantity of valid data units of the first data block;

apply, to the second quantity of valid data units, a second weight associated with the second type of data to determine a weighted second quantity of valid data units of the first data block;

select the first data block from the plurality of data blocks for a reorganization procedure in accordance with a weighted valid address count of the first data block that is determined in accordance with an average of the weighted first quantity of valid data units of the first data block and the weighted second quantity of valid data units of the first data block; and select a second data block of the plurality of data blocks for the reorganization procedure, wherein the second data block is selected after the first data block is selected in accordance with a weighted valid address count of the second data block being greater than the weighted valid address count of the first data block.

16. The non-transitory computer-readable medium of claim 15,
wherein a total valid address count of the second data block is less than a total valid address count of the first data block.

17. The non-transitory computer-readable medium of claim 15, wherein the instructions, when executed by the one or more processors of the memory system, further cause the memory system to:
receive, from a host system, a command to write data to a data unit of the first data block, the command comprising an indication of a type of the data; and
increment the first quantity of valid data units or the second quantity of valid data units in accordance with the type of data indicated by the command.

18. The non-transitory computer-readable medium of claim 15, wherein the instructions, when executed by the one or more processors of the memory system, further cause the memory system to:
receive, from a host system, a plurality of commands to write respective data to a plurality of data units of the first data block, wherein each command comprises an indication that the respective data is associated with the first type of data; and
adjust the first weight in accordance with an accuracy of the indication that the respective data is associated with the first type of data.

19. The non-transitory computer-readable medium of claim 15, wherein the instructions, when executed by the one or more processors of the memory system, further cause the memory system to:
receive, from a host system, a plurality of commands to write respective data to a plurality of data units of the first data block, wherein each command comprises an indication that the respective data is associated with the second type of data; and
adjust the second weight in accordance with an accuracy of the indication that the respective data is associated with the second type of data.

20. The non-transitory computer-readable medium of claim 15, wherein the instructions, when executed by the one or more processors of the memory system, further cause the memory system to:

determine a first valid address count of the first data block associated with the first type of data and a second valid address count of the first data block associated with the second type of data; and determine, in response to accessing a data structure that tracks respective types of data associated with data units of the first data block, a first quantity of invalid data units of the first data block associated with the first type of data and a second quantity of invalid data units of the first data block associated with the second type of data, wherein the first quantity of valid data units corresponds to a difference between the first valid address count and the first quantity of invalid data units and the second quantity of valid data units corresponds to a difference between the second valid address count and the second quantity of invalid data units.

21. The non-transitory computer-readable medium of claim 15, wherein the instructions, when executed by the one or more processors of the memory system, further cause the memory system to:
receive, from a host system, one or more commands to write data to one or more data units of one or more other data blocks of the plurality of data blocks, the one or more commands comprising one or more logical addresses associated with the data;
mark one or more data units of the first data block as invalid in accordance with the one or more data units storing previously written data associated with the one or more logical addresses; and
decrement the first quantity of valid data units or the second quantity of valid data units in accordance with an indication of a type of data included in one or more logical-to-physical records associated with the first data block.

22. A method, comprising:
determining, for a first data block of a plurality of data blocks, a first quantity of valid data units of the first data block associated with a first type of data and a second quantity of valid data units of the first data block associated with a second type of data;
applying, to the first quantity of valid data units, a first weight associated with the first type of data to determine a weighted first quantity of valid data units of the first data block;
applying, to the second quantity of valid data units, a second weight associated with the second type of data to determine a weighted second quantity of valid data units of the first data block;
selecting the first data block from the plurality of data blocks for a reorganization procedure in accordance with a weighted valid address count of the first data block that is determined in accordance with an average of the weighted first quantity of valid data units of the first data block and the weighted second quantity of valid data units of the first data block; and
selecting a second data block of the plurality of data blocks for the reorganization procedure, wherein the second data block is selected after the first data block is selected in accordance with a weighted valid address count of the second data block being greater than the weighted valid address count of the first data block.

23. The method of claim 22,
wherein a total valid address count of the second data block is less than a total valid address count of the first data block.

* * * * *